May 24, 1938.  W. BLACKMORE  2,118,146

JOURNAL BOX

Original Filed June 8, 1931  2 Sheets-Sheet 1

Inventor:
*William Blackmore*
By his Attorney
*Clarence A. Kerr*

May 24, 1938.  W. BLACKMORE  2,118,146
JOURNAL BOX
Original Filed June 8, 1931   2 Sheets-Sheet 2
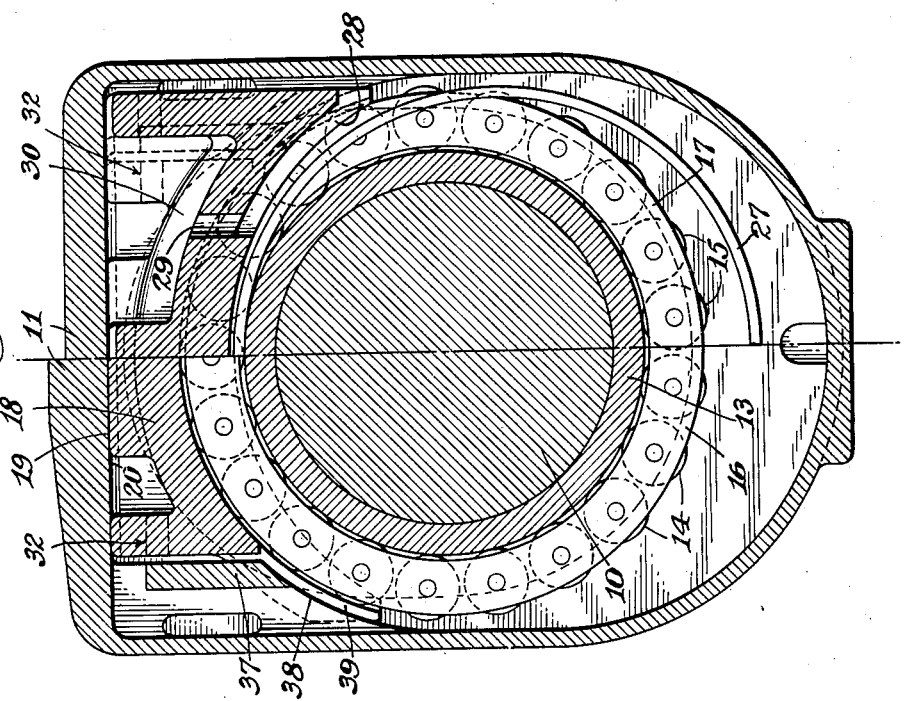
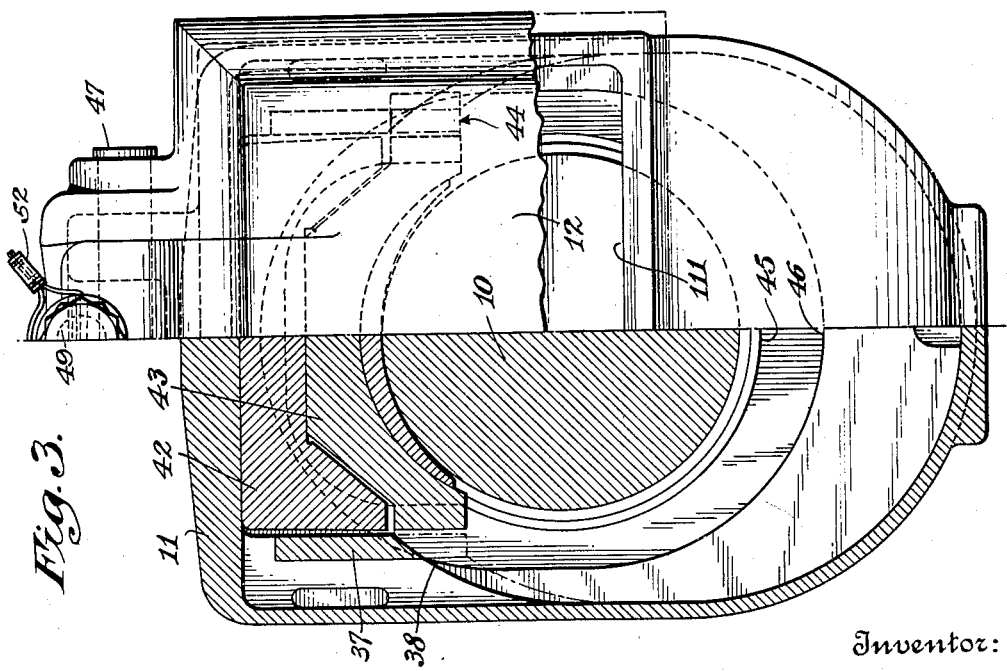
Inventor:
William Blackmore
By his Attorney
Clarence A. Kerr Patented May 24, 1938

2,118,146

UNITED STATES PATENT OFFICE 2,118,146

JOURNAL BOX

William Blackmore, Cleveland Heights, Ohio, assignor to National Malleable and Steel Castings Company, Cleveland, Ohio, a corporation of Ohio Original application June 8, 1931, Serial No. 542,912. Divided and this application February 28, 1934, Serial No. 713,353

5 Claims. (Cl. 308—44)

This invention relates to improvements in journal boxes and particularly has reference to journal boxes which may readily be adapted for the reception of either the standard form of wedge and brass or a roller bearing construction. This is a division of my pending application Ser. No. 542,912 filed June 8, 1931.

It has been an important object of the present invention to develop a new form of journal box which is ideally adapted for the reception of roller bearing elements and at the same time is capable of use in connection with the present standard plain bearing elemen's. The arrangement is such that when new journal boxes are embodied in car trucks they may be equipped with the ordinary brasses and wedges but at some time in the future when it is desired to convert the cars to the roller type of bearings only slight, readily effected changes, if any, in the construction of the boxes are required. Furthermore, when one of the improved boxes has been modified to receive roller bearings it is still capable of utilizing the standard wedge and brass so that should a converted box require repair at a shop not provided with spare roller units, the old wedge and brass elements may be put in.

One of the features of the improved box is the construction of the outer end of the same in such a way that the roller bearing units may be inserted at this end instead of through the inner or rear end of the box. To enable the assembly of the roller units from the front of the box, the opening at this end will preferably, at least in some instances, be made larger than in the present standard forms of plain bearing boxes. This is particularly true of the 5½" x 10" boxes and may apply to other boxes, depending upon various conditions, such as the size of the rollers, etc.

Provision is made, in accordance with the invention, for the sealing of the outer closure of the journal box so that when it is used as a roller bearing unit it will be opened for inspection only by authorized inspectors. This will tend to obviate the danger of having a workman, unfamiliar with roller bearings, insert a batch of waste in the box. Obviously if waste is inserted it may become entangled and cause considerable damage to the various parts of the roller bearing.

The general outward appearance of the box contemplated by this invention may be made substantially the same as that of the standard plain bearing boxes and it is adapted for use in connection with the same character of side frames and other standardized features of boxes of corresponding size.

Other features and advantages of the invention will appear from the detailed description of an illustrative form of the same which will now be given in conjunction with the accompanying drawings, in which:

Figure 2 is a transverse vertical section view through the box, the right hand portion being taken along the line IIA—IIA and the left hand portion being taken along the line IIB—IIB of Figure 1, and Figure 3 is a view partly in front elevation and partly in vertical section along the line IIB—IIB of Figure 1, showing the plain bearing elements in position.

Figure 1:
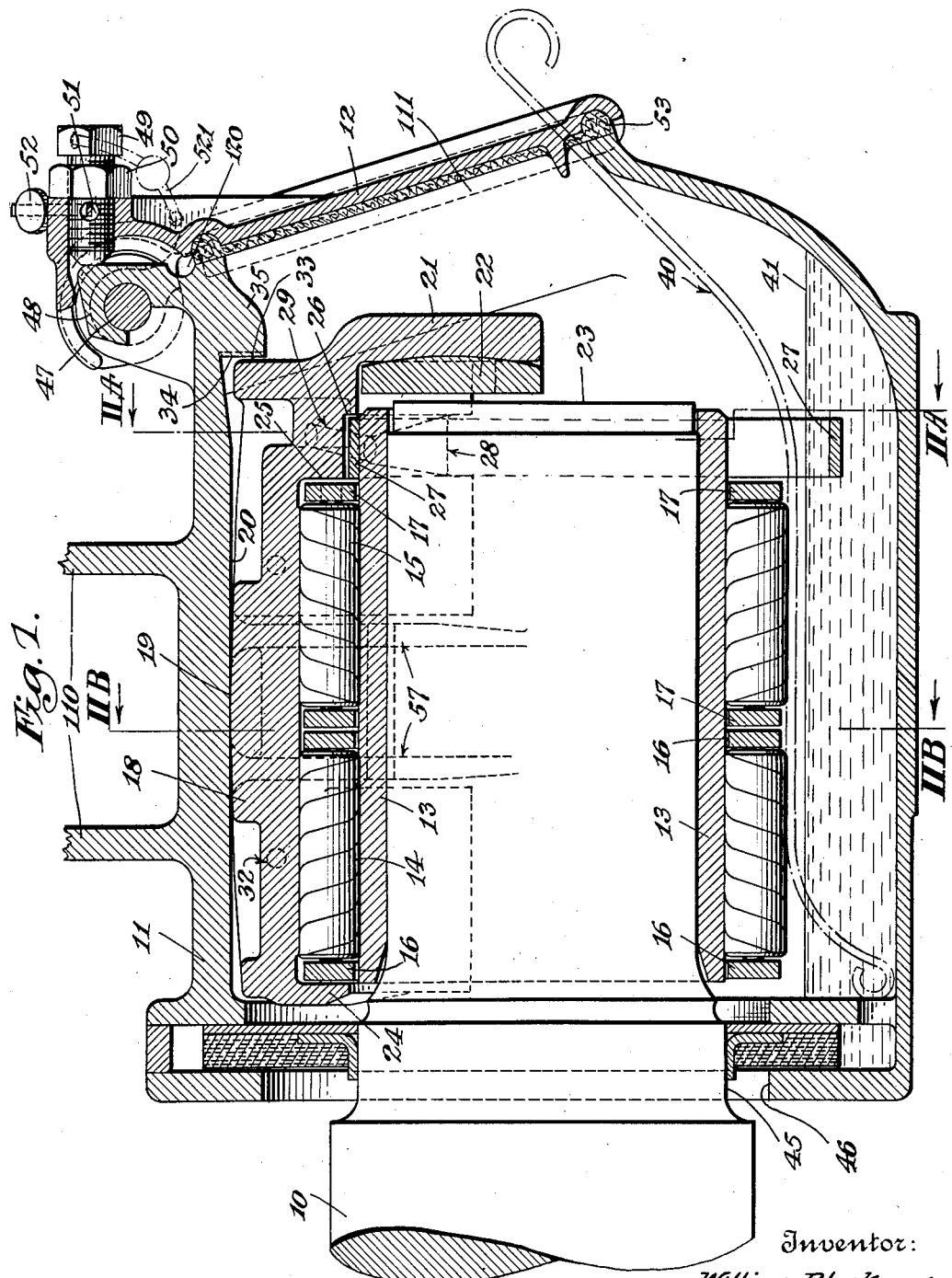
Figure 1 is a longitudinal, vertical section through the improved journal box, showing the roller bearing units in place.

Referring now particularly to Figures 1 and 2, there is shown the end of an axle or journal 10, of suitable construction, passed through an opening at the rear of a journal box 11, which, in the form of the invention illustrated, is made integral with a side frame, a small portion 110 of which is shown. It will be apparent that the various features of the present invention may be embodied in a separable journal box and it is illustrated in conjunction with an integral box simply for the purpose of convenience.

At its outer or front end the box is provided with a hinged lid 12. This lid is adapted to close an opening 111 which is of substantially the standard depth but may be wider than the ordinary opening in order to permit the roller bearing elements to be inserted through the front of the box, as will be more fully explained hereinafter. The outer end of the journal preferably has secured thereto a sleeve 13 adapted to form a raceway for the two series of rollers 14 and 15. The rollers 14 are preferably carried by complete annular cage members 16 while the rollers 15 are carried by similar annular cage members 17. A bearing member 18 is provided above the two sets of rollers to provide an outer raceway for the latter. This bearing member is provided with an upper bearing surface 19 which is preferably curved slightly, in the arc of a circle longitudinal of the axis of the journal, and cooperates with a flat surface 20 formed on the inner side of the top of the box. The provision of the arcuate surface 19 enables the desired vertical angling of the box.

At its forward end the member 18 is provided with a downwardly extending portion 21 adapted to retain a thrust bearing block 22, in the manner disclosed in my pending application Serial Number 465,169 filed July 1, 1930. The block 22 preferably has a spherical portion seated against a corresponding portion of the extension 21 and has a flat portion cooperating with the flat outer end 23 of the journal. At its inner or rear end the member 18 is provided with a downwardly extending flange 24 which is adapted to cooperate with and retain the rear cage element 16. A corresponding shoulder 25 is provided at the forward end of the member 18 to cooperate with the forward cage element 17. Substantially in the plane of the outer end of the journal there is provided a shoulder 26 on the under side of the member 18 which forms a pocket, with the forward cage element 18, adapted to receive an oil ring 27 surrounding the journal adjacent its outer end. Opposite the ring 27 the wall of the member 18 is provided with a groove 28 on each side of its longitudinal axis. This groove in each case is tapered from a portion of relatively great width at the bottom to a materially narrowed width at the top. This, as more fully explained in my previously mentioned pending application, is for the purpose of forcing the oil, which is picked up by the ring, under a substantial pressure into a reservoir at the top of the bearing member 18. An opening 29 extends from the upper or smaller end of each groove 28 into the bottom of the reservoir formed in the bearing member.

The thrusts between the journal box and the member 18 in the opposite direction are taken by a pair of shoulders (not shown), one at each side of the member in cooperation with lugs 37 extending inwardly from the side walls of the box. As will be noted from an inspection of Figure 2, the lower edges 38 of the lugs are arcuately formed about the axis of the journal and at a sufficient radius from the latter to provide a clearance with respect to the rollers 14 and 15. In rear of the lug 37 the member 18 is provided with an apron-like extension 39 which, when the member is raised into its operative position, as shown in Figures 1 and 2, will be in line with a portion of the projection. However, in the course of assembly the member 18 is in a lowered position. The apron 39 at this time will be below the under surface 38 of the projection.

The angular movement between the journal box and the bearing member must be limited so that the rollers will not come into engagement with the walls of the box. This movement can be limited by properly adjusting the clearances between the shoulders on the bearing member and the lugs 37 on the journal box.

Should it be desired to use this form of box in connection with the brass and wedge of a plain bearing this may readily be done, as illustrated in Figure 3. The wedge 42 and the brass 43 may be carried between the inner surface of the top of the journal box and the top of the journal, as here shown. Lateral projections 44 carried by the brass in advance of the projections 37 of the box, i. e. in substantially the same position as the shoulders of the member 18 cooperate with the projections 37 to transmit and accept thrusts in one direction. One of these projections is shown in dotted outline in Figure 3, it being understood that the section along which the left half of this figure is taken is in the rear of the projection on this side.

In lieu of terminating the projections 37 along the edges 38, they may be extended downwardly, as indicated in broken lines in Figure 3, to present a more substantial thrust surface in line with the lateral extensions 44. They would then be in conformity with a type of brass lug now commonly employed. This will enable the construction to be more readily used at the outset in connection with these plain bearing elements. When it is later desired to convert the box into a roller bearing assembly, these projections may then be burned or cut back to the contour indicated at 38. In the assembly and removal of the plain bearing eelments, it is necessary to lift the box off of the journal to a sufficient extent to permit the wedge and brass to be readily inserted and withdrawn. This upward movement of the box relative to the journal is permitted by a suitable reduction, at the point 45, in the diameter of the journal which is sufficient to provide the necessary clearance from the rear edge 46, of the box.

In order that workmen, who may be inexperienced, may not have access to the box, means are provided in accordance with the present invention for preventing opening of the cover 12 by unauthorized persons. It will be apparent that if a workman should place waste in the bottom of the box, as in the case of an ordinary plain bearing box, this waste would become tangled in the roller bearings and would be apt to cause serious damage. The lid 12 may be hinged in the usual way about a pivot pin 47 carried by a hinge lug 48. A bolt 49 may be threaded through a boss formed on the lid adjacent the hinge lug and when it is desired to prevent opening of the lid this bolt may be screwed up tightly against the lug, as shown in Figure 1. A locknut 50 may be provided, if desired, to prevent accidental loosening of the bolt. To insure opening of the lid only by authorized inspectors, the bolt 49, as well as the boss through which it is threaded, may be provided with aligned openings 51 adapted to receive a wire or flat strip forming part of a seal 52. If desired the band of the seal may be simply passed through an opening in the head of the bolt and through another opening in a portion of the lid as indicated in broken lines at 521 in Figure 1. If desired, the seal may have impressed in it a symbol indicating the inspector or other party who has last examined and sealed the box or the shop or yard at which the seal has been applied. When an inspection is to be made it will be understood that the seal is broken, the lock-nut 50 is loosened and the bolt 49 backed away until its inner end will clear the nose of the hinge lug.

For the purpose of excluding dirt and water as far as possible, a gasket 53 formed of rubber, or the like, may be provided between the lid 12 and the edge of the opening 111 in the journal box, as best shown in Figure 1.

In the closing of the lid the lower end is first brought against the lower edge of the opening into the box and as the bolt 49 is turned to more tightly close the lid the upper end of the same is forced against the upper edge of the opening. Thus it will be seen that the lid becomes a lever of the first class having a force acting outwardly in line with the bolt 49 and another force acting outwardly at the lower edge of the lid. These forces oppose each other in their effort to turn the lid about the pin 47. It will be apparent, therefore, that as the force created by the bolt is increased, that produced at the bottom of the lid is also increased with the result that the lid tends to bend about some line between the two points where the opposed forces are applied. This bending tendency is greatest at a point near the pivot pin since the lever arm of the force acting on the lower edge of the lid is greatest here. Obviously, any such bending that takes place will tend to throw the upper edge of the lid toward and against the upper edge of the box opening. To permit a desirable amount of flexing of the lid for this purpose the side flanges of the same are cut away slightly, as indicated at 120 (Figure 1). This allows for a slight amount of yielding which is sufficient to provide a good tight fit all around the edges of the opening.

While one illustrative form of the invention has been disclosed in considerable detail, it will be understood that various changes in the construction and arrangement of the features of the box and the elements cooperating therewith may be made without departing from the general spirit and scope of the invention.

What I claim is:

1. In a device of the class described a journal box adapted to receive a journal, a hinge lug formed at the top of said box, a lid pivotally carried by said lug upon a horizontal pivot passing through said lug, and means carried by said lid and cooperating with said lug to prevent opening of said lid, said means being adapted to receive a seal which must be broken to render said means ineffective.

2. In a device of the class described a journal box adapted to receive a journal, a hinge lug formed on said box adjacent its top, a closure for said box pivotally carried by said lug upon a horizontal pivot passing through said lug, and a bolt carried by said closure and arranged to cooperate with said lug to prevent opening of said closure, said bolt and closure having openings adapted to be alined to receive a sealing element.

3. In a device of the class described a journal box adapted to receive a journal, a hinge lug formed on said box adjacent its top, a closure for said box pivotally carried by said lug upon a horizontal pivot passing through said lug, a bolt carried by said closure and arranged to cooperate with said lug to prevent opening of said closure, and sealing means connecting said bolt with said closure to substantially prevent relative movement between them.

4. In a device of the class described, a journal box adapted to receive a journal and having a lid engaging surface, a hinge lug formed at the top of said box, a closure for said box pivotally carried by said lug, adjustable means entering said lid and adapted to engage said lug for forcing said lid into closed position, said lid being constructed and arranged to permit flexing thereof to provide a tight fit of said lid on said surface in response to the force created upon engagement of said adjustable means with said lug.

5. In a device of the class described, a journal box adapted to receive a journal and having an opening in one end thereof, said box having a closure engaging surface surrounding said opening, a hinge lug formed on said box, a closure for said box pivotally mounted on said lug, and a bolt threaded through said closure and so arranged that its end cooperates with said lug to prevent opening of said closure, said closure being constructed and arranged to permit relative movement between portions thereof to provide a tight fit of said closure on said surface when said bolt is in position to prevent opening of said closure.

WILLIAM BLACKMORE.